(12) United States Patent
Wieland

(10) Patent No.: US 7,806,395 B2
(45) Date of Patent: Oct. 5, 2010

(54) TENSIONING OR GRIPPING DEVICE IN PARTICULAR A LINEAR OR CENTERING GRIPPER

(75) Inventor: Wolfgang Wieland, Ilsfeld (DE)

(73) Assignee: Schunk GmbH & Co. KG Spann- und Greiftechnik, Lauffen am Neckar (DE)

( * ) Notice: Subject to any disclaimer, the term of this patent is extended or adjusted under 35 U.S.C. 154(b) by 256 days.

(21) Appl. No.: 11/667,409

(22) PCT Filed: Nov. 7, 2005

(86) PCT No.: PCT/EP2005/011865

§ 371 (c)(1),
(2), (4) Date: Sep. 21, 2007

(87) PCT Pub. No.: WO2006/050880

PCT Pub. Date: May 18, 2006

(65) Prior Publication Data

US 2008/0122155 A1    May 29, 2008

(30) Foreign Application Priority Data

Nov. 10, 2004   (DE) ................. 10 2004 054 177

(51) Int. Cl.
*B23Q 3/00* (2006.01)
(52) U.S. Cl. .................. 269/136; 269/139
(58) Field of Classification Search ......... 269/136, 269/138, 139, 43, 254 CS
See application file for complete search history.

(56) References Cited

U.S. PATENT DOCUMENTS

| | | | | |
|---|---|---|---|---|
| 4,934,674 A | * | 6/1990 | Bernstein | 269/43 |
| 5,098,073 A | * | 3/1992 | Lenz | 269/43 |
| 5,242,159 A | * | 9/1993 | Bernstein | 269/32 |
| 5,351,943 A | * | 10/1994 | Milz | 269/246 |
| 5,720,476 A | | 2/1998 | Swann | |
| 5,906,365 A | * | 5/1999 | Wu | 269/43 |
| 5,924,684 A | * | 7/1999 | Cheng | 269/139 |
| 5,950,999 A | * | 9/1999 | Lin | 269/139 |
| 5,975,511 A | * | 11/1999 | Bohler | 269/43 |
| 6,139,001 A | | 10/2000 | Buck | |

(Continued)

FOREIGN PATENT DOCUMENTS

DE        33 37 047        3/1987

(Continued)

*Primary Examiner*—Lee D Wilson
(74) *Attorney, Agent, or Firm*—Paul Vincent

(57) ABSTRACT

A tensioning or gripping device in particular a linear or centering gripper, comprises at least one displaceable base jaw (14) and a false jaw (16) which may be placed on the base jaw (14), whereby the false jaw (16) comprises two coupling sections (22, 24), running at least in part perpendicular to the direction (20) of displacement of the base jaw (14) and arranged one behind the other in the direction (20) of displacement of the base jaw (14), for connection to the base jaw (14). The base jaw (14) comprises a spring-loaded pin (18), running in the direction (20) of displacement of the base jaw, which, with the false jaw (16) placed on the base jaw (14), acts against a coupling section (24) for retaining the false jaw (16), such that the other coupling section (22) is tensioned against a stop surface (26) arranged on the base jaw (14).

12 Claims, 2 Drawing Sheets

U.S. PATENT DOCUMENTS

| | | | |
|---|---|---|---|
| 6,250,620 B1 * | 6/2001 | Durfee, Jr. | 269/43 |
| 2008/0122155 A1 * | 5/2008 | Wieland | 269/136 |

FOREIGN PATENT DOCUMENTS

| | | |
|---|---|---|
| DE | 196 04 649 | 8/1997 |
| DE | 198 26 435 | 9/1999 |
| DE | 102 19 524 | 11/2003 |
| EP | 0 744 249 | 11/1996 |

* cited by examiner

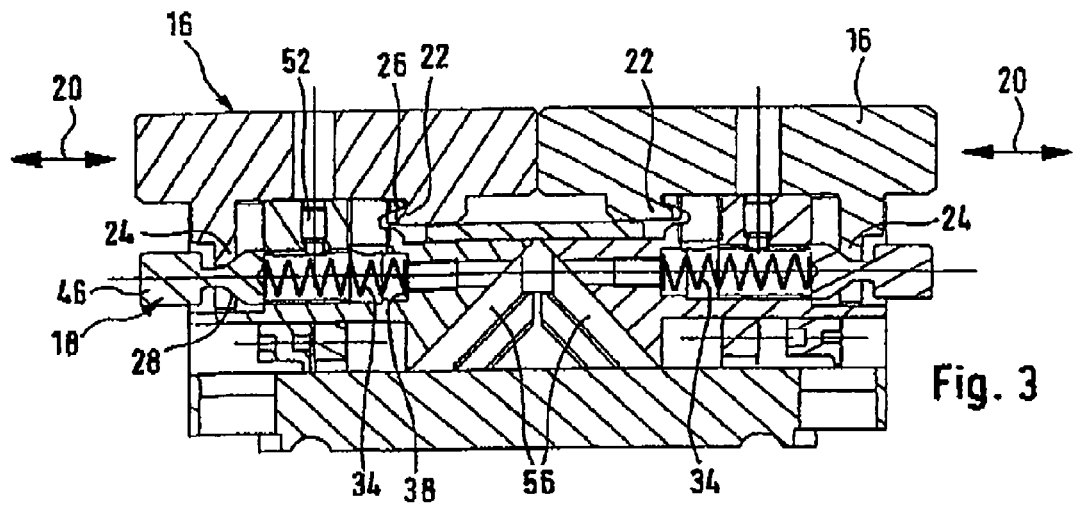
Fig. 3
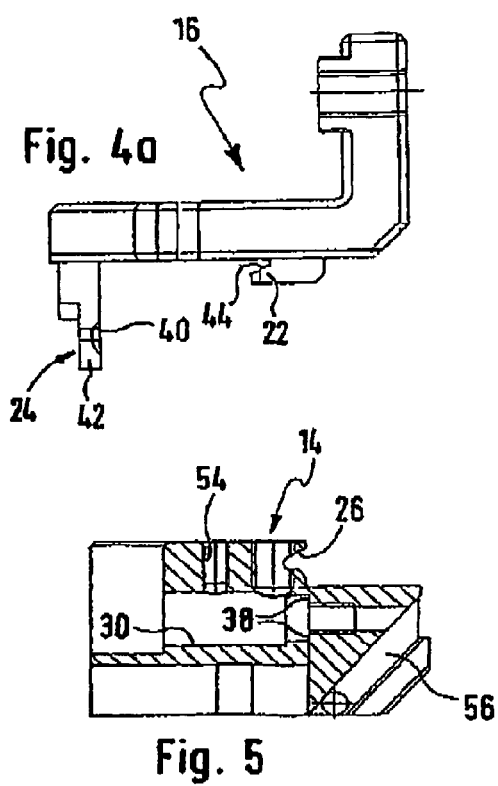
Fig. 4a
Fig. 4b
Fig. 5
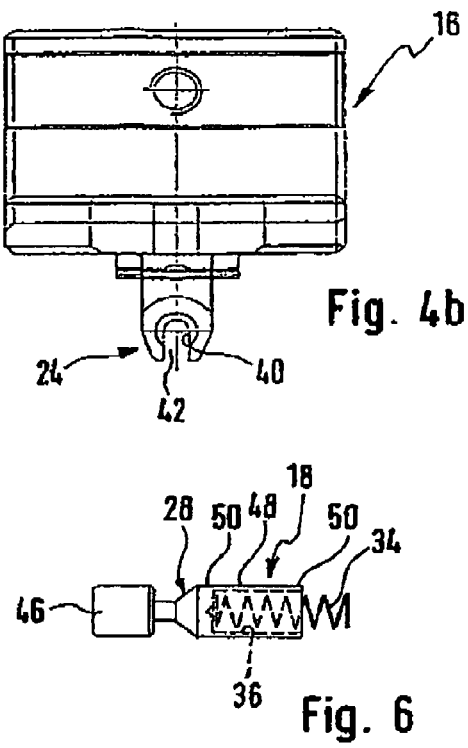
Fig. 6

TENSIONING OR GRIPPING DEVICE IN PARTICULAR A LINEAR OR CENTERING GRIPPER

This application is the national stage of PCT/EP2005/011865 filed on Nov. 7, 2005 and also claims Paris Convention priority of DE 10 2004 054 177.9 filed on Nov. 10, 2004.

BACKGROUND OF THE INVENTION

The invention concerns a tensioning or gripping device, in particular, a linear or centering gripper, comprising at least one displaceable base jaw and a false jaw which may be placed on the base jaw, whereby the false jaw comprises two coupling sections running, at least in part, perpendicular to the direction of displacement of the base jaw and arranged one behind the other in the direction of displacement of the base jaw for connection to the base jaw. The invention also concerns a base jaw and a false jaw for such tensioning or gripping devices.

DE 102 19 524 A1 discloses a clamping chuck comprising a base jaw onto which a false clamping jaw can be detachably mounted. A pin is provided in the base jaw, which extends parallel to the clamping chuck axis and engages a pin receptacle provided in the false clamping jaw, for mounting the false clamping jaw. This prior art is problematic in that play-free arrangement of the false clamping jaw on the base jaw requires highly accurate production tolerances of the guidance of the pin and the pin receptacle.

DE 38 23 933 A1 discloses a clamping unit, wherein a clamping body is disposed on a main jaw. Analog to prior art according to DE 102 19 524 A1, this conventional device comprises a pin which engages a pin receptacle provided on the clamping body parallel to the chuck axis. The production tolerances must thereby also be precisely kept in order to realize play-free arrangement of the clamping body on the main jaw.

It is therefore the underlying purpose of the present invention to provide a clamping or gripping device for disposing a false jaw on a base jaw, if possible without play, in particular, in the direction of displacement.

SUMMARY OF THE INVENTION

This object is achieved in accordance with the invention with a clamping or gripping device or the above-mentioned type in that the base jaw comprises a bolt which is loaded by spring force, guided in the displacement direction of the base jaw, and acts against a coupling section of the false jaw when the false jaw is disposed on the base jaw to hold the false jaw, such that the other coupling section is loaded against an abutment surface disposed on the base jaw. This ensures that there is no play between the base jaw and the false jaw in the direction of displacement of the base jaw. Secure retention of the false jaw on the base jaw is nevertheless possible.

The base jaw may thereby comprise a spring element which acts against the bolt. The spring element may thereby advantageously be captured in a spring receptacle or be disposed in a spring cage in the base jaw.

In accordance with the invention, the bolt may moreover comprise a contact section for abutment against a coupling section, wherein the contact section and/or the coupling section that cooperates with the contact section is/are formed at least in sections like a wedge and/or cone with the result that, due to cooperation between the bolt and the corresponding coupling section, forces may also be transmitted transversely to the direction of displacement of the base jaw.

With particular advantage, the coupling section that cooperates with the contact section is designed complementarily to the contact section. This realizes, in particular, flat abutment of the contact section on the coupling section.

In accordance with a further embodiment of the invention, the bolt may penetrate at least through sections of the coupling section cooperating therewith, such that the free end of the bolt is accessible and can be loaded against the spring force. This is advantageous in that, for releasing the false jaw from the base jaw, the accessible free end of the bolt can be moved against the spring force load. The bolt can thereby be deflected such that it no longer cooperates with the coupling section and the false jaw can be removed from the base jaw. The free accessible end of the bolt may thereby, in particular, project past the base jaw and/or the false jaw in the longitudinal direction of the bolt.

In this connection, the coupling section may have a hole or elongated hole which is open on one side and into which the bolt or at least sections thereof can be inserted from the side. The bolt may thereby either have a recess, in particular, an annular recess or a collar, in particular, an annular collar which then cooperates with the coupling section. The recess or the collar may thereby also have a wedge and/or conical shape. The region of the coupling section that borders the open hole or elongated hole then cooperates with the recess or the elevation of the bolt.

In accordance with a further development of the invention, the bolt may comprise a stop for delimiting the displaceability of the bolt. The stop of the bolt thereby preferably acts against the base jaw or against a pin provided on the base jaw.

In accordance with a further development of the invention, the coupling section which does not cooperate with the bolt comprises a wedge section for engaging behind and/or wedging with the abutment surface of the base jaw. The false jaw may thereby assume a predetermined position defined relative to the base jaw via the wedge section. The abutment surface may thereby provide a counter wedge section which may be designed complementarily to the partial section of the coupling section with the result that the false jaw is optimally disposed on the base jaw.

The wedge section, the abutment surface of the base jaw, which cooperates with the wedge section, the bolt or its contact section, and the coupling section that cooperates with the bolt are thereby advantageously designed such that when the false jaw is disposed onto the base jaw, the false jaw is loaded against the base jaw due to the spring load of the bolt. This can be achieved, in particular, through suitable selection and orientation of the wedge section and the contact section of the bolt.

In an advantageous embodiment of the invention, when the false jaw is disposed onto the base jaw, the false jaw including coupling section which is not provided for cooperation with the bolt, can be disposed on the abutment surface of the base jaw, and the false jaw can be pivoted about this coupling section in the direction of the base jaw until the other coupling section reaches the engagement area of the bolt. In this fashion, the false jaw can be disposed onto the base jaw in a simple manner.

In accordance with the invention, the bolt and/or the coupling section that cooperates with the bolt may comprise guiding slopes, such that when the coupling section reaches the engagement area of the bolt, the bolt is initially displaced against the spring force and, in the final mounting position, the bolt snaps into a holding position. This is advantageous in that no further mounting steps or tools are required for disposing the false jaw on the base jaw. In accordance with this embodiment of the invention, the false jaw is disposed onto the base jaw and is snapped therewith.

In accordance with the invention, locking means may moreover be provided for locking the bolt in its mounting position acting against one coupling section. The bolt is consequently axially fixed in the final mounting position and automatic release of the bolt and consequently of the false jaw is safely prevented. Feasible locking means are, in particular, screwable locking pins which extend transversely to the longitudinal axis of the bolt. An eccentric screw may also be used as a locking means which loads the bolt transversely to its longitudinal axis in a positive and/or non-positive fashion.

In accordance with the invention, the base jaw or base jaws may be displaceable in the direction of displacement by means of a wedge hook gearing. Motion of an actuating member perpendicular to the direction of displacement of the base jaws can be deflected to the base jaw via the wedge hook gearing. A desired transmission ratio can be achieved through selection of the wedge angle.

The invention also concerns a base jaw and a false jaw for an inventive means.

BRIEF DESCRIPTION OF THE DRAWING

Further features and details of the invention can be extracted from the following description, which describes and explains the invention in more detail with reference to the embodiment shown in the drawing.

FIG. 3 shows a longitudinal section through the gripping means in accordance with FIG. 1;

FIG. 4a shows a side view of the false jaw in accordance with FIG. 2;

FIG. 4b shows a front view of the false jaw in accordance with FIG. 4a;

FIG. 5 shows a longitudinal section through the base jaw in a accordance with FIG. 2; and FIG. 6 shows a longitudinal section through the bolt of FIG. 3, showing the individual components.

DESCRIPTION OF THE PREFERRED EMBODIMENT

Figure 1:
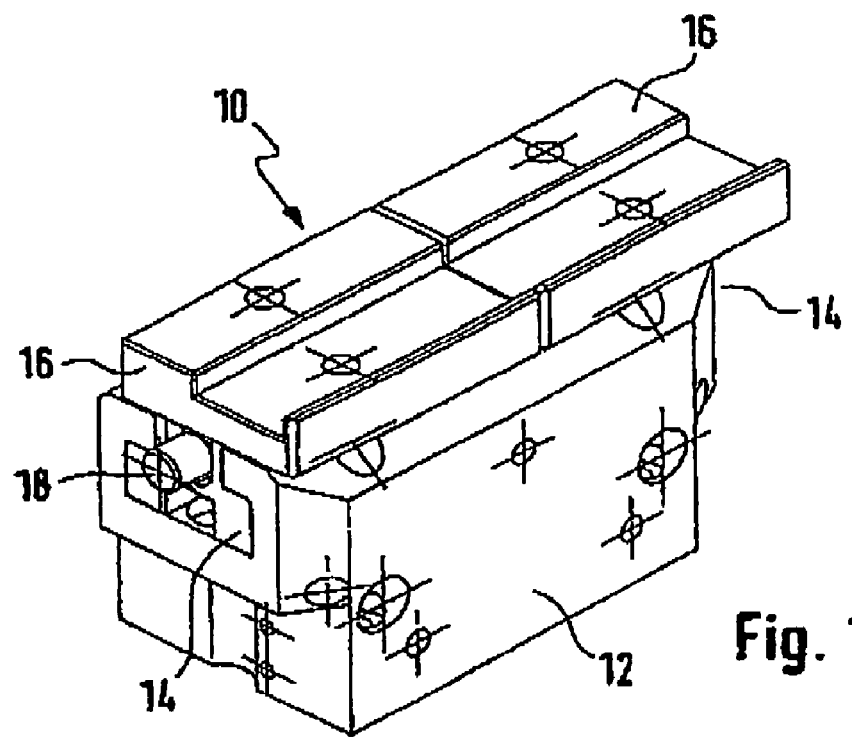
FIG. 1 shows a perspective view of an inventive gripping means.

FIG. 1 shows an inventive gripping device 10 in the form of a parallel gripper having two jaws. The gripping device 10 comprises a basic housing 12 that houses two base jaws 14 which can be displaced along a line towards and away from each other. A false jaw 16 is disposed on each of the two base jaws. Bolts 18 are disposed on each base jaw 14 for mounting the false jaws 16 to the base jaws 14.

Figure 2:
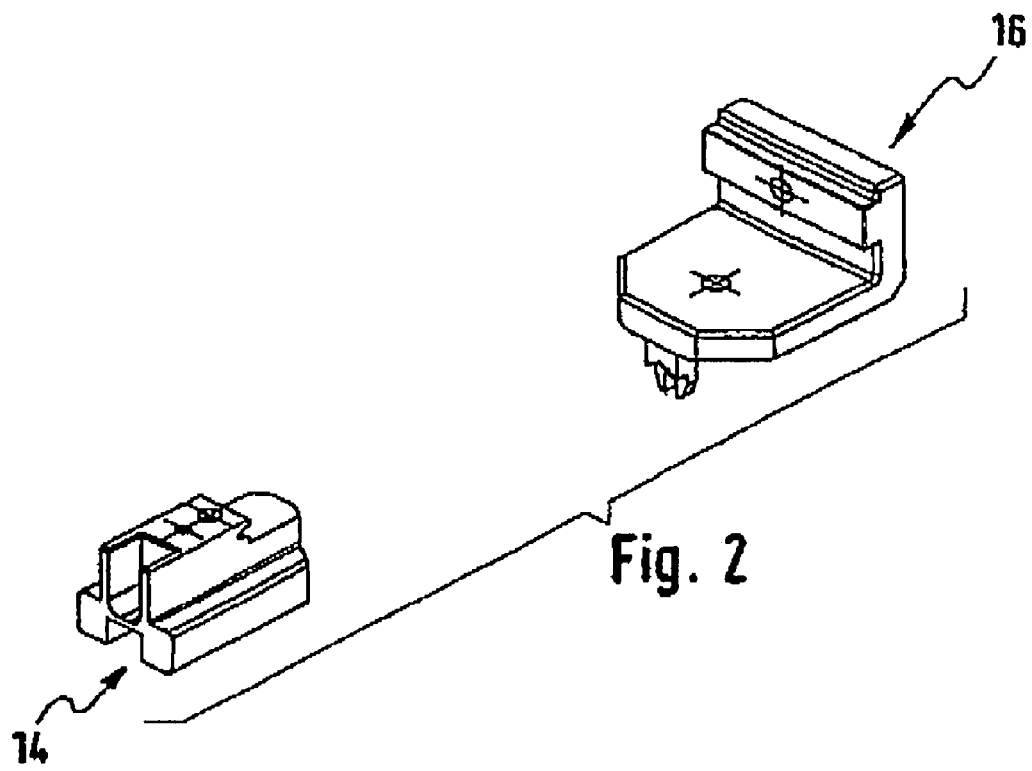
FIG. 2 shows a perspective view of the individual parts of a base jaw and a false jaw.

FIG. 2 shows the base jaw 14 and a false jaw 16 which has a slightly different design compared to FIG. 1. Details of the base jaw 14 and the false jaw 16 are explained in FIGS. 3 through 6.

The longitudinal section shown in FIG. 3 clearly shows that each false jaw 16 comprises two coupling sections 22 and 24 which extend transversely to the direction of displacement indicated by the double arrow 20. The coupling section 22 acts against an abutment surface 26 on the side of the base jaw when the false jaw 16 is disposed onto the base jaw 14. The coupling section 24 is loaded by the bolt 18 or by a conical contact section 28 of the bolt 18 when the false jaw 16 is disposed onto the base jaw 14. The bolt 18 is thereby disposed in a bolt guidance 30 (clearly shown in FIG. 5) to be movable in the direction of displacement 20 of the base jaw. The bolt 18 is thereby loaded against the coupling section 24 by a helical spring 34. The helical spring 34 is thereby supported on the end face of a blind-pocket-like spring receptacle 36 provided in the bolt and on a stop 38 on the base jaw side. The spring force-loaded bolt 18 loads the coupling section 22 against the base jaw-side abutment surface 26 for holding the false jaw 16 on the base jaw 14.

As is clearly shown in FIGS. 3, 4 and 6, the coupling section 24 is designed complementarily to the wedge-like contact section 28, i.e. the coupling section 24 has an abutment surface 40 which flatly abuts the contact section 28. This abutment surface 40 extends like an annular section around the closed end of an elongated hole 42 on the coupling section 24, which is open at one end (clearly shown, in particular, in FIG. 4b). When the false jaw 16 is disposed onto the respective base jaw 14, the bolt 18 or its contact section 28 is inserted into the elongated hole 42 until the contact section 28 abuts the abutment surface 40. When the false jaw 16 is disposed onto the base jaw 14, the coupling section 22 may initially be brought into operative connection with the respective abutment surface 28, wherein the false jaw 16 can be pivoted about the coupling section 22 or the abutment surface 26 in the direction of the base jaw 14 until the coupling section 24 reaches the engagement area of the bolt 18. The bolt 18 and/or the coupling section 24 thereby advantageously have insertion slopes such that when the coupling section 24 reaches the engagement area of the bolt 18, the bolt is initially displaced against the spring force and then, in its final mounting position, snaps into its holding position, in which the abutment surface 40 abuts the contact section 28.

As is clearly shown in FIGS. 3, 4 and 5, the coupling section 22 has a wedge section 44 which extends transversely to the direction of displacement 20 and faces the coupling section. In the embodiment shown in the figures, the abutment surface 26 on the side of the base jaw is designed parallel to the wedge surface 44, i.e. the abutment surface 26 extends at an angle relative to the direction of displacement 20 and faces the wedge section 44. When the coupling section 24 is loaded by the spring force-loaded bolt 18, the false jaw 16 is loaded in the direction of the base jaw 14. The false jaw 16 is consequently wedged in the direction of the base jaw. This is further increased by the likewise inclined abutment surface 40 on the coupling section 24 and the complementary contact section 28 on the bolt 18. When an object is gripped between the two false jaws 16, the wedge surface 44 is also loaded against the abutment surface 26.

As is clearly shown in FIG. 3, the bolt 18 penetrates through sections of the elongated hole 42 when the false jaw 16 is disposed onto the base jaw 14, such that the free end 46 of the bolt 18 can be accessed. By manually pressing the free end 46 against the force of the spring 34, the contact section 28 of the bolt 18 is deflected from the area of engagement of the coupling section 24 and the false jaw 16 can be removed from the base jaw 14. This permits simple and fast removal or exchange of the false jaws 16. No additional tools are required.

In order to delimit the displaceability of the bolt 18, the bolt 18 has an elongated hole 48 which extends in the direction of motion 20, whose opposing ends 50 delimit the motion of the bolt 18. In the mounted state, a stop pin 52 engages the elongated hole 48 (FIG. 3). The stop pin 52 can thereby be screwed into a thread 54 disposed on the base jaw 14 (FIG. 5).

As shown in FIG. 3, the two base jaws 14 have inclined tension grooves 56 on the mutually facing sides, into which an actuating member engages which can be displaced perpendicularly to the direction of displacement 20 (not shown). The two base jaws are moved towards or away from each other by axial adjustment of the adjusting member. The inclined tension grooves 56 form a wedge hook gearing together with the actuating member.

I claim:

1. A gripping device, the device comprising:
    at least one displaceable base jaw;
    at least one false jaw disposed on and cooperating with said base jaw, said false jaw having a first and a second coupling section each of which extends, at least in sections, transversely to a direction of displacement of said base jaw, said first and second coupling sections being disposed behind each other in said direction of displacement of said base jaw; and
    a spring force-loaded bolt guided in said direction of displacement of said base jaw for acting against said first coupling section to load said second coupling section against an abutment surface of said base jaw, thereby holding said false jaw, said bolt penetrating at least through sections of said first coupling section, wherein a free end of said bolt is accessible for loading against said spring force.

2. The device of claim 1, wherein said base jaw comprises a spring element which acts against said bolt.

3. The device of claim 1, wherein said bolt has a contact section for abutment against said first coupling section, wherein at least sections of said contact section or of said first coupling section are designed as a wedge or cone.

4. The device of claim 3, wherein said first coupling section is designed complementarily to said contact section.

5. The device of claim 1, wherein said first coupling section has a hole or elongated hole which is open on one side and into which at least sections of said bolt can be inserted.

6. The device of claim 1, wherein said bolt has at least one stop which delimits a displaceability thereof.

7. The device of claim 1, wherein said second coupling section comprises a wedge section for engagement behind and/or wedging with said abutment surface of said base jaw.

8. The device of claim 7, wherein said wedge section, said abutment surface of said base jaw, said bolt, and said coupling section are designed such that said false jaw is loaded towards said base jaw.

9. The device of claim 1, wherein said second coupling section can be disposed onto said abutment surface of said base jaw and said false jaw can be pivoted about said second coupling section in a direction of said base jaw until said first coupling section reaches an engagement area of said bolt.

10. The device of claim 9, wherein said bolt or said first coupling section have guiding slopes, such that, when said first second coupling section reaches said engagement area of said bolt, said bolt is initially displaced against said spring force to snap into a holding position of a final mounting position of said bolt.

11. The device of claim 9, wherein said bolt is locked in a mounting position, acting against said first coupling section, by a locking means.

12. The device of claim 1, wherein said at least one base jaw can be displaced in a direction of displacement via a wedge hook gearing.

* * * * *